United States Patent

Takamori

[11] Patent Number: 5,991,056
[45] Date of Patent: Nov. 23, 1999

[54] IMAGE PROCESSING APPARATUS FOR PERFORMING TONAL AND COLOR MATRIX TRANSFORMATIONS

[75] Inventor: Tetsuya Takamori, Kanagawa, Japan

[73] Assignee: Fuji Photo Film Co., Ltd., Kanagawa, Japan

[21] Appl. No.: 08/719,699

[22] Filed: Sep. 27, 1996

[30] Foreign Application Priority Data

Sep. 29, 1995 [JP] Japan ................................... 7-252475

[51] Int. Cl.$^6$ ...................................................... G03F 3/08
[52] U.S. Cl. ................................................ 358/523; 358/518
[58] Field of Search .................................... 358/518, 515, 358/523, 524, 527, 529, 532, 534, 535, 444, 447, 520, 500, 530; 382/162, 165, 167, 169, 172, 266, 254, 263; 345/431

[56] References Cited

U.S. PATENT DOCUMENTS

| | | | |
|---|---|---|---|
| 4,785,347 | 11/1988 | Ezuka et al. | 358/532 |
| 5,357,354 | 10/1994 | Matsunawa et al. | 358/530 |
| 5,359,437 | 10/1994 | Hibi | 358/529 |
| 5,387,988 | 2/1995 | Hiratsuka et al. | 358/515 |
| 5,552,904 | 9/1996 | Ryoo et al. | 358/518 |
| 5,581,376 | 12/1996 | Harrington | 358/518 |
| 5,636,290 | 6/1997 | Kita et al. | 382/167 |
| 5,642,204 | 6/1997 | Wang | 358/532 |
| 5,657,068 | 8/1997 | Ohta | 347/232 |
| 5,673,335 | 9/1997 | Ohta et al. | 382/167 |

FOREIGN PATENT DOCUMENTS 7288692  10/1995  Japan.

*Primary Examiner*—Madeleine Nguyen
*Attorney, Agent, or Firm*—Sughrue, Mion, Zinn, Macpeak & Seas, PLLC

[57] ABSTRACT

The improved image processing apparatus has a circuit for tonal and color matrix transformations of image which performs tonal transformation on image data of three primary colors and with which a 4×3 matrix is multiplied by a column matrix composed of the tone transformed image data so as to produce four-color image data including image data of a block color, and this circuit for tonal and color matrix transformations of image has: a lookup table in which the values of multiplication of the tone transformed image data, which have been obtained from the image data of three primary colors using nonlinear tonal transformation curves for the respective colors, by the elements of the matrix to be subjected to matrix multiplication have been written for each color in association with all of the image data of three primary colors; address signal generator which generates address signals for referencing the lookup table from the image data of three primary colors and color identification signals; and accumulator which adds the values of multiplication within the lookup table for each color as addressed by the address signal generated by the address signal generator and which repeats the addition by a predetermined number of times. The apparatus features a smaller circuit scale and is capable of precise corrections of four colors Y, M, C and K by performing independent nonlinear transformations on the respective colors.

5 Claims, 4 Drawing Sheets

IMAGE PROCESSING APPARATUS FOR PERFORMING TONAL AND COLOR MATRIX TRANSFORMATIONS

BACKGROUND OF THE INVENTION

This invention relates to an image processing apparatus for performing tonal and color matrix transforming on image signals. The apparatus may be applied to a color scanner system which reads image on an original, performs predetermined image processing steps and which thereafter produces a platemaking film. In this application, the apparatus is typically used to perform preliminary image processing steps such as color processing and sharpening on the input signal.

In the printing and platemaking fields, an image scanning, reading and reproducing system which produces a platemaking film by electrically processing the image information carried on an original has been extensively used with a view to streamlining the operational process and improving the image quality.

The system consists basically of an image reading apparatus which is an input machine and an image recording apparatus which is an output machine. The image reading apparatus uses typically a reading scanner which is transported in a sub-scanning direction such that the image information carried on the original is read by photoelectric scanning with a solid-state imaging device such as a CCD (charge coupled device) and converted to an electric signal. The image information thusly undergoing photoelectric conversion is sent to an associated image processing apparatus, where it is subjected to predetermined image processing in accordance with the preset conditions for platemaking. If the original image is a continuous tone image, its shades are subsequently reproduced by generating halftones to effect conversion to a halftone image, which in turn is supplied to the image recording apparatus where it is converted to an optical signal such as one of laser light and recorded on an image recording medium comprising a light-sensitive material such as a film. The image recording medium is processed photographically with a specified processor to produce a platemaking film for subsequent use as in printing.

The conventional image scanning, reading and reproducing system is such that image signals of three primary colors, such as red (R), green (G) and blue (B), are color processed for conversion to image signals of four colors Y, M, C and K, which are then subjected to resolution transformation, edge (sharpness) enhancement, tonal (gradation) transformation and other processing steps in that order, before they are finally delivered as output image signals Y, M, C and K to the image recording apparatus.

In order to reproduce an image having a greater degree of sharpness or three-dimensional effect, sharpeness or edge enhancement is performed on the image data. In the conventional sharpeness enhancement circuit, unsharp signal data are first constructed from the original image data. Then, the unsharp signal data is subtracted from the original image data to construct USM (UnSharp Mask) data. Finally, the original image data are added to the USM signal data times a constant, thereby constructing a sharpened image data. This procedure is repeated for individual monochromatic image data.

When original image data of three primary colors is to be sharpened in the prior art, said original image data is first converted to original image data of four colors including K (black) color in a color processing circuit which performs various steps such as 3-4 transformation, color correction and tonal transformation and then sharpening is carried out with the above-described sharpening circuit.

With a view to improving the conventional technology for sharpening color image data, the assignee of the subject application proposed in Japanese Patent Application No. 80733/1994 an image processing method and apparatus which are capable of freely changing the densities of respective colors, Y, M, C and K such that the degree of sharpness is adjustable to a desired level for the density of each color and which are capable of producing image data for reproducing image of reduced noise.

The proposed image processing apparatus is shown in FIG. 5, in which the apparatus is generally indicated by 80. As shown, the image processing apparatus 80 comprises: a tone transforming circuit 82 using a lookup table (LUT) for tonal transformation from 10-bit image data of three primary colors R, G and B to 8-bit image data of Y, M and C; a matrix computing circuit 84 in which a 4×3 matrix is multiplied by a column matrix composed of the tone transformed image data of three primaries, thereby effecting conversion to 8-bit image data of four colors Y, M, C and K; a color processing and transforming circuit 86 in which the 10-bit image data of three primaries are subjected to color processing steps such as 3–4 transformation, color correction and tonal transformation, thereby effecting conversion to 8-bit image data of four colors Y, M, C and K; and a sharpening circuit 92 consisting of a USM signal data constructing circuit 88 which receives the four-color image data from the matrix computing circuit 84 to construct USM signal data for each color and an adder circuit 90 which, for each color, adds the 4-color USM signal data to the 4-color image data delivered from the color processing and transforming circuit 86.

The LUT 82 stores 8-bit image data for each of the three colors Y, M and C, such as Yj (j=0–255), Mj (j=0–255) and Cj (j=0–255), that have been obtained by performing a specified procedure of tonal transformation on all of the 10-bit image data for each of the three primary colors, say, R, G and B, namely, Ri (i=0–1023), Gi (i=0–1023) and Bi (i=0–1023). For example, LUT 82 is such that the tone transformed image data that correspond to image data Ri (i=0–1023) are written at addresses (0,0)–(0,1023), data corresponding to Gi (i=0–1023) are written at addresses (1,0)–(1,1023), and data corresponding to Bi (i=0–1023) are written at addresses (2,0)–(2,1023); the LUT 82 outputs 8-bit tone transformed image data (Yj, Mj, Cj) that have been read in response to the 10-bit input image data (Ri, Gi, Bi).

In the matrix computing circuit 84 at the next stage, a 4×3 matrix is multiplied by a column matrix of input image data (Yin, Min, Cin) to deliver an output (Yout, Mout, Cout, Kout) in accordance with the following formula (I):

$$\begin{bmatrix} Yout \\ Mout \\ Cout \\ Kout \end{bmatrix} = \begin{bmatrix} a_{11} & a_{12} & a_{13} \\ a_{21} & a_{22} & a_{23} \\ a_{31} & a_{32} & a_{33} \\ a_{41} & a_{42} & a_{44} \end{bmatrix} \begin{bmatrix} Yin \\ Min \\ Cin \end{bmatrix} \quad \text{Formula (I)}$$

A problem with the image processing apparatus 80 shown in FIG. 5 is that in order to perform tonal transformations and matrix calculations as pre-sharpening steps, tone transforming LUT 82 and matrix computing circuit 84 are respectively required and this adds to the scale of the overall circuit. As a further problem, matrix computing circuit 84 requires a number of multipliers, which adds to the cost of the circuit.

Another problem concerns the 3–4 transformation for transforming image data of three primary colors to image data of four colors. Since the first step of this process is tonal transformation from 10-bit image data to 8-bit data, image data of the fourth color, namely, K (black) color, will be subjected to matrix calculations on the basis of tone transformed image data of three primary colors such as Y, M and C and the intended matrix computation cannot be performed independently of those data of three primary colors. In other words, independent tone transformed data cannot be constructed for the fourth (i.e., black) color.

SUMMARY OF THE INVENTION

The present invention has been accomplished under these circumstances and has as an object providing an image processing apparatus for performing tonal and color matrix transformations of image, which features a small circuit scale and which is capable of precise corrections of four colors Y, M, C and K by performing independent nonlinear transformations on the respective colors.

This object of the invention can be attained by an image processing apparatus having a circuit for tonal and color matrix transformations of image which performs tonal transformation on image data of three primary colors and with which a 4×3 matrix is multiplied by a column matrix composed of the tone transformed image data so as to produce four-color image data including image data of a black color, characterized in that said circuit for tonal and color matrix transformations of image has:

a lookup table in which the values of multiplication of the tone transformed image data, which have been obtained from said image data of three primary colors using nonlinear tonal transformation curves for the respective colors, by the elements of said matrix to be subjected to matrix multiplication have been written for each color in association with all of said image data of three primary colors;

address signal generating means which generates address signals for referencing said lookup table from said image data of three primary colors and color identification signals; and accumulation means which adds said values of multiplication within said lookup table for each color as addressed by the address signal generated by said address signal generating means and which repeats the addition by a predetermined number of times.

DETAILED DESCRIPTION OF THE INVENTION

The image processing apparatus of the invention will now be described in detail with reference to the preferred embodiments shown in accompanying FIGS. 1–4.

Figure 1:
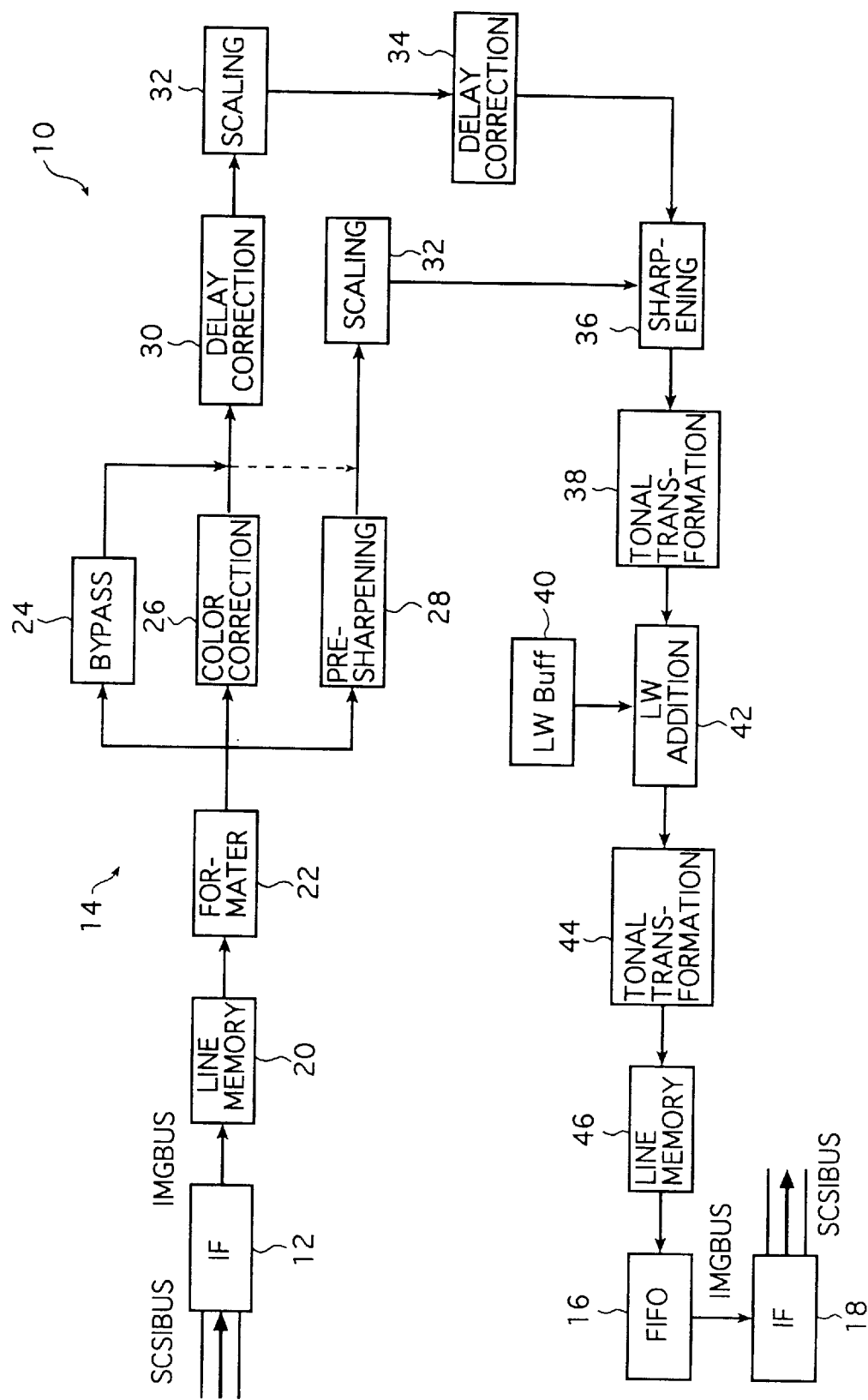
FIG. 1 is a block diagram of an image processing apparatus according to an embodiment of the present invention.

FIG. 1 is a block diagram of the image processing apparatus according to an embodiment of the invention. The apparatus generally indicated by 10 in FIG. 1 comprises a small computer systems interface (hereunder referred to as "SCSIF") on the input side 12, an image processing circuit 14, a small-capacity image buffer 16 on the output side which may be a 2-MB FIFO (first-in first-out) memory and an SCSIF 18 on the output side. The image processing circuit 14 in turn comprises an alternate line memory 20 for storing temporarily the image signal received from the SCSIF 12, a formater 22, a bypass circuit 24, a color correcting circuit 26, a pre-sharpening circuit 28, a sub-scan delay correcting circuit 30, scaling circuits 32, a main scan delay correcting circuit 34, a sharpening circuit 36, a tone transforming circuit 38, a line-work buffer (LWBuff) 40, a linework (LW) addition circuit 42, a lookup table (%-QLLUT) 44 and an alternate line memory 46.

Input alternate line memory 20 and output alternate line memory 46 are both a toggle memory and adapted to perform the necessary operation at all times in response to an internal sync signal. The line memory 20 on the input side is typically composed of a 32-kB×4-line dual port RAM (DPRAM), by means of which the 16-bit data on the R, G and B color image signals from the SCSIF 12 are converted to 8-bit data. By switching between lines before scaling independently of line switching after scaling and vice versa, the line memory 20 is capable of accommodating the scaling in the sub-scan direction by linear interpolation. The line memory 46 on the output side is typically composed of a 128-kB×2-line RAM, by means of which the 8-bit data on each of the Y, M, C and K color image signals from the tone transforming circuit 44 are converted to 16-bit data; the line memory 46 is also capable of transforming a line-sequential signal to a dot-sequential signal and the thus transformed data are written into the FIFO 16.

Formater 22 is for transforming both the R, G and B color image data and the Y, M, C and K color image data into internal formats and, in the case under consideration, the 3- and 4-color signals combined with the 8-, 16- and 10-bit signals are all transformed to 10-bit Y(B), M(G), C(R) and K dot-sequential signals.

Bypass circuit 24 is for sending the high-order 8 bits in the input data to a point upstream of the scaling circuit 32 without changing their order.

Color correcting circuit 26 transforms the R, G and B color image data to Y, M, C and K color image data by performing color corrections including 3–4 conversion and tonal transformation with the high-order 5 bits using a 3-D lookup table (LUT).

Pre-sharpening circuit 28, which is the most characterizing portion of the invention, uses a 1-D lookup table (LUT) to perform matrix calculations for tonal transformation and 3- to 4-color transformation. Further details of the pre-sharpening circuit 28 will be given below.

Since the individual components of the image processing circuit 14 are adapted to perform pipelining, delay stages will occur unavoidably. The sub-scan delay correcting circuit 30 and the main scan delay correcting circuit 34 are used to correct the delays in sub-scanning and main scanning operations, respectively, due to the sharpening process.

Scaling circuit 32 will perform not only zooming (scaling) in the main scanning direction by linear interpolation but also resolution transformation on the four-color image data resulting from color corrections, the four-color image data resulting form the pre-sharpening process, as well as on the four-colored image data from the bypass circuit 24. Other functions of the scaling circuit 32 are to move the main scanning position and transform a dot-sequential signal to a line-sequential signal.

Sharpening circuit 36 which is designed for edge enhancement will perform a sharpening process as in the conventional manner described above using tow image data, one being of the four-color image signals from the pre-sharpening circuit 28 and the other of the four-color image signals from the color correcting circuit 26 or bypass circuit 24. The sharpening circuit 36 is capable of selecting either the output of color correcting circuit 26 or the output of bypass circuit 24 around the color correcting circuit 26 depending on whether the input image data signals are 3- or 4-colored. Therefore, the formater 22 which is an input format transforming portion has the ability to provide a four-color input, thereby providing for selection between the output of color correcting circuit 26 and that of bypass circuit 24. Thus, not only the R, G and B color image data but also the Y, M, C and K color image data, if they are fed into the image processing circuit 14, can be subjected to prescribed image processing operations such as scaling, resolution transformation, edge enhancement, tonal transformation, and the addition of line-work items such as register marks, comments and borderlines, and the thus processed image data are delivered as an output to the image recording apparatus for preparing a color platemaking film.

Tone transforming circuit 38 uses an 8-bit input/8-bit output lookup table (8/8 LUT) to perform tonal transformations by negative-to-positive reversal and enhancing or attenuating highlights (HL) or shadows (SD).

Line-work buffer (LWBuff) 40 is a 2-MB buffer memory storing information on line-work items such as register marks, comments and borderlines. Line-work addition circuit 42 adds the line-work information to the image signal so that it is superposed on the image being reproduced from the image data.

Tone transforming circuit 44 is such that an image signal of a predetermined bit length, say, 8 bits (which hence has 0–255 tones) is transformed to a necessary number of tones, say, 0–100 tones. The thus obtained image data is entered into line memory 46, where it is converted to continuous data having no broken lines. The continuos data is then sent to FIFO 16, buffered and generated halftones by passage through an SCSIF 73 at the appropriate timing such that it can be forwarded to an output interface unit for delivery into the image recording apparatus.

Pre-sharpening circuit 28 is for performing the tonal transformation and color matrix transformation of image simultaneously in the present invention and, specifically, it has a capability for achieving 10 to 8 bit conversion and generating 4-color data signals from 3-color signals. Thus, the pre-sharpening circuit 28 performs matrix calculations according to formula (II) set forth below, thereby generating 8-bit four-color image data signals (Yout, Mout, Cout, Kout) from 10-bit three-primary image data signals (Yin, Min, Cin):

Yout=$a_{11}$×Fy (Yin)+$a_{12}$×Fy (Min)+$a_{13}$×Fy (Cin)

Mout=$a_{21}$×Fm (Yin)+$a_{22}$×Fm (Min)+$a_{23}$×Fm (Cin)

Cout=$a_{31}$×Fc (Yin)+$a_{32}$×Fc (Min)+$a_{33}$×Fc (Cin)

Figure 4:
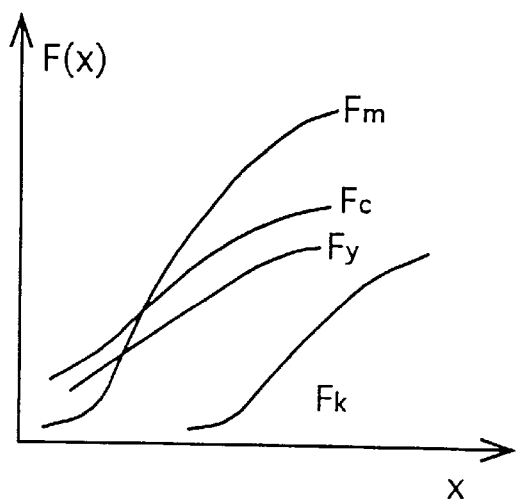
FIG. 4 is a graph showing exemplary nonlinear transformation curves for use in constructing the lookup table shown in FIG. 3.
Figure 5:
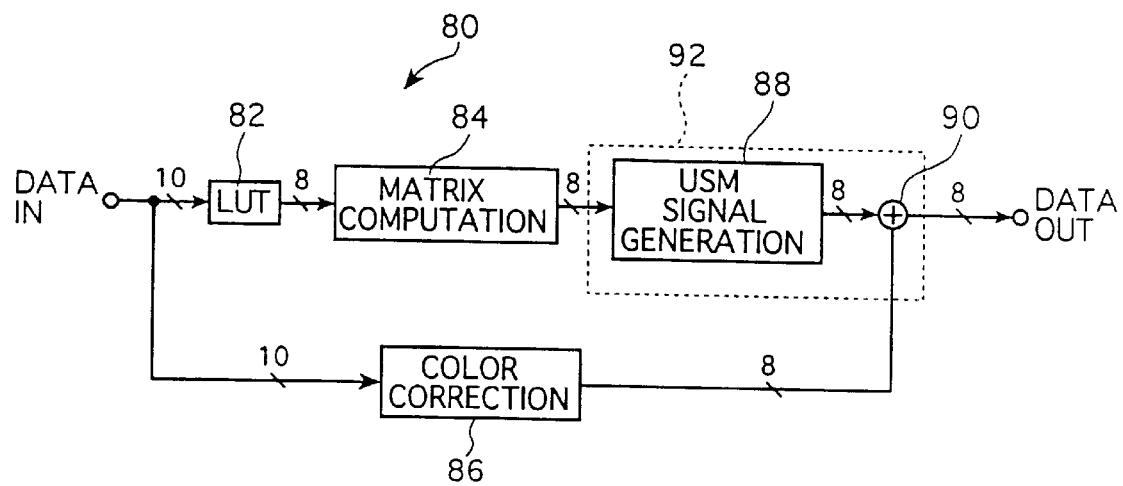
FIG. 5 is a block diagram of a prior art image processing circuit.

Kout=$a_{41}$×Fk (Yin)+$a_{42}$×Fk (Min)+$a_{43}$×Fk (Cin)    Formula (II)

where Fy(x), Fm(x), Fc(x) and Fk(x) represent nonlinear tone transforming functions which are used to provide values of tonal transformation that are determined in accordance with nonlinear transformation curves such as those illustrated in FIG. 4. Symbols $a_{11}$, $a_{12}$, $a_{13}$, $a_{21}$, $a_{22}$, $a_{23}$, $a_{31}$, $a_{32}$, $a_{33}$, $a_{41}$, $a_{42}$ and $a_{44}$ are the elements of the matrix which is to be multiplied by a column matrix in accordance with the following formula (I):

$$\begin{bmatrix} Yout \\ Mout \\ Cout \\ Kout \end{bmatrix} = \begin{bmatrix} a_{11} & a_{12} & a_{13} \\ a_{21} & a_{22} & a_{23} \\ a_{31} & a_{32} & a_{33} \\ a_{41} & a_{42} & a_{44} \end{bmatrix} \begin{bmatrix} Yin \\ Min \\ Cin \end{bmatrix} \quad \text{Formula (I)}$$

Figure 2:
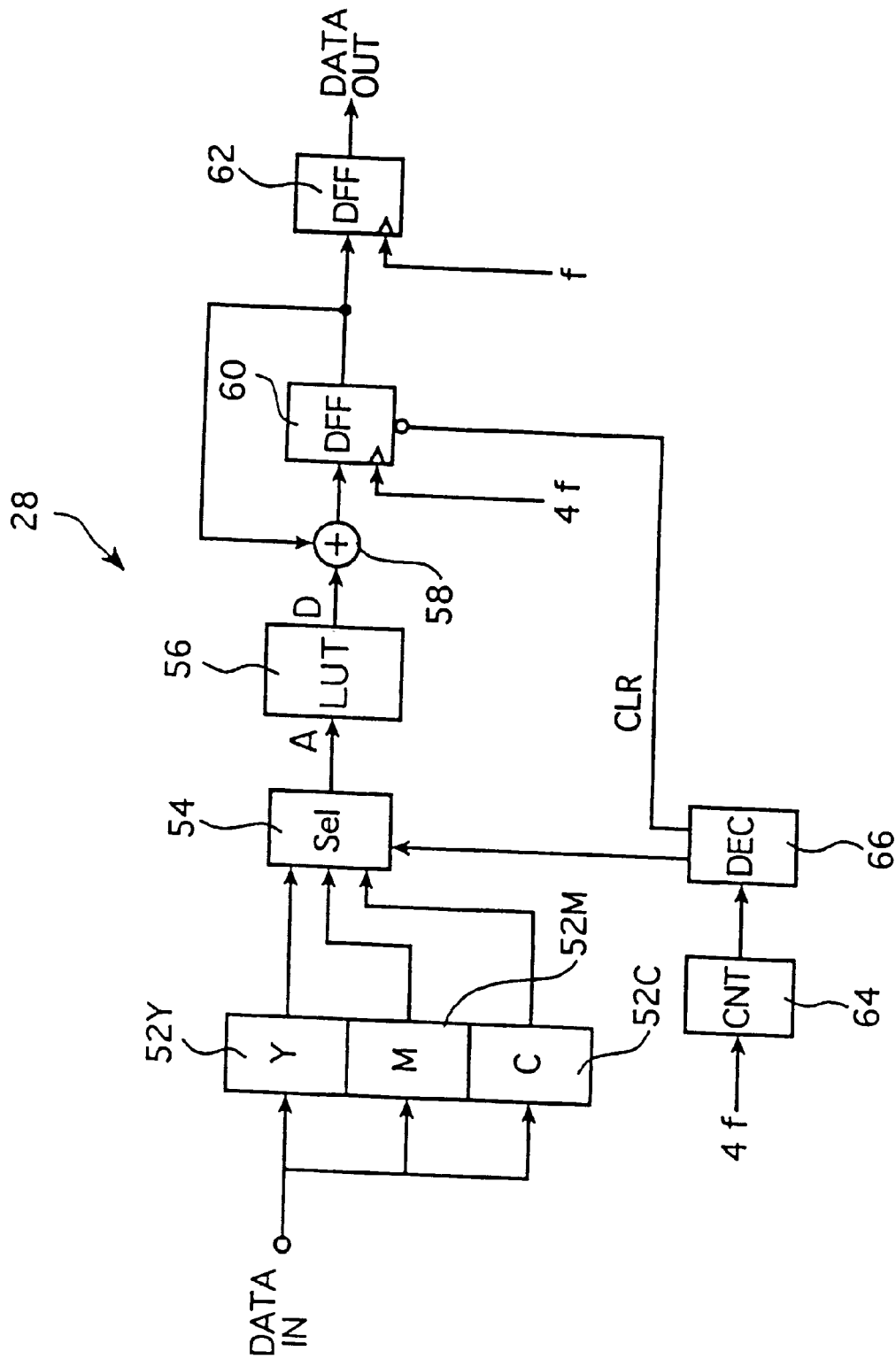
FIG. 2 is a block diagram of a pre-sharpening circuit for use in the image processing circuit shown in FIG. 1 according to an embodiment of the invention.
Figure 3:
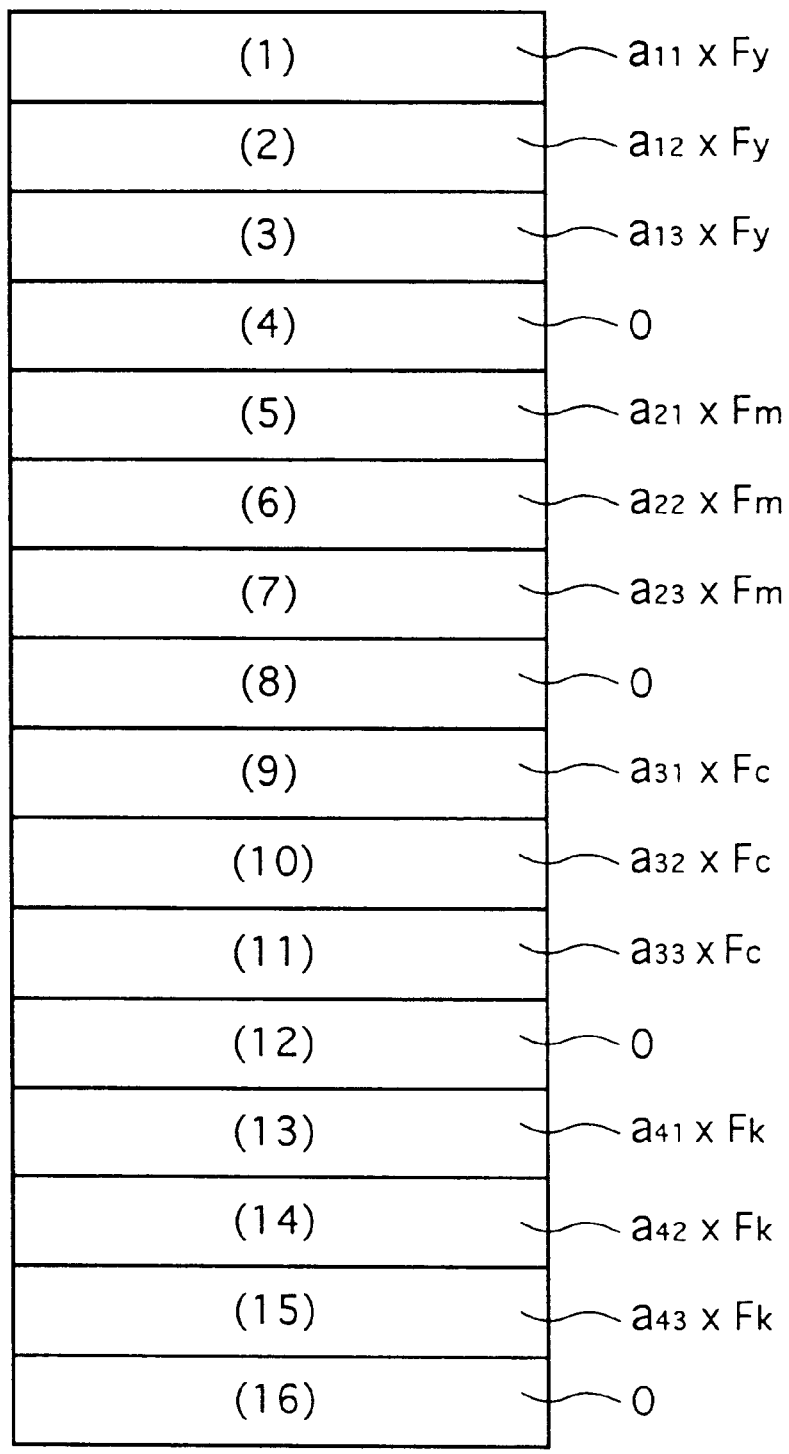
FIG. 3 shows diagrammatically an example of the internal composition of a lookup table for use in the pre-sharpening circuit shown in FIG. 2.

FIG. 2 is a block diagram of pre-sharpening circuit 28 according to an embodiment of the invention and FIG. 3 illustrates an example of the internal composition of the LUT for use in the invention. As shown in FIG. 2, the pre-sharpening circuit 28 comprises: registers 52Y, 52M and 52C in which serial signals for image data on three primary colors such as Y, M and C which are to be fed at the image data input terminal DATA IN are held parallel for each of the colors Y, M and C; a selector (Sel) 54 for establishing selective connections to registers 52Y, 52M and 52C; a lookup table (hereunder abbreviated as LUT) 56 for storing the values of multiplication of nonlinear tone transformed image data by the coefficients of the matrix for matrix computation which are to be read out in response to the image data signal selected by means of selector 54; an adder 58 for adding up the values of multiplication being read out of LUT 56; a D flip-flop (hereunder abbreviated as DFF) 60 for latching the values of addition by the adder 58; a DFF 62 with which the image data being delivered from DFF 60 is latched temporarily before it is delivered from an image data output terminal DATA OUT, a counter (CNT) 64 for generating a timing signal for establishing selective connections between the selector 54 and each register, as well as a timing signal for clearing (erasing) DFF 60, and a decoder (DEC) 66.

The LUT 56 used in the present invention has the internal composition shown in FIG. 3. As shown, the first row of LUT 56 is such that the product $a_{11}$×Fy (Yin), or the result of multiplication of matrix element $a_{11}$ by Fy (Yin) (0–255) which represents the image data obtained by 8-bit tone transformation through nonlinear transformation Fy of 10-bit whole input image data Yin (0–1023), is written at addresses (0,0,0)–(0,0,1023). Similarly, the product $a_{12}$×Fy (Min) is written in the second row at addresses (0,1,0)–(0, 1,1023); the product $a_{13}$×Fy (Cin) is written in the third row at addresses (0,2,0)–(0,2,1023); however, zero is written in the fourth row at all of the addresses (0,3,0)–(0,3,1023). In the subsequent fifth row, the product $a_{21}$×Fm is written at addresses (1,0,0)–(1,0,1023); the products $a_{22}$×Fm and $a_{23}$× Fm are written in the sixth and seventh rows, respectively; however, zero is written in the eighth row at all of the addresses (1,3,0)–(1,3,1023). Similarly, the products $a_{31}$× Fc, $a_{32}$×Fc, $a_{33}$×Fc, 0, $a_{41}$×Fk, $a_{42}$×Fk, $a_{43}$×Fk and 0 are written in the subsequent rows.

Let us here express the addresses by (α,β,γ);then, α refers to the color identification number of an output, as exemplified by 0 for Y (yellow), 1 for M (magenta), 2 for C (cyan) and 3 for K (black); β refers to the color identification number of an input and may assume 0, 1 and 2 for Y, M and C, respectively, with 3 representing zero; and γ refers to the image data per se.

The relationship between each of the addresses in the LUT 56 and the data written in that address will be understood more clearly by referring to following examples:

Address offset: Image data (i: integer of 0–1023)
0x0000~0x03ff : Ydata[0][i]={$a_{11}$×Fy[i]}; 0x0400~0x07ff :

Ydata[1][i]={$a_{12}$×Fy[i]}; 0x0800~0x0bff : Ydata[2][i]={$a_{13}$×Fy[i]}; 0x0c00=0x0fff : Ydata[3][i]={0}; 0x1000~0x13ff : Mdata[0][i]={$a_{21}$×Fm[i]}; 0x1400~0x17ff : Mdata[1][i]={$a_{22}$×Fm[i]}; 0x1800~0x1bff : Mdata[2][i]={$a_{23}$×Fm[i]}; 0x1c00~0x1fff : Mdata[3][i]={0}; 0x2000~0x23ff : Cdata[0][i]={$a_{31}$×Fc[i]}; 0x2400~0x27ff : Cdata[1][i]={$a_{32}$×Fc[i]}; 0x2800~0x2bff : Cdata[2][i]={$a_{33}$×Fc[i]}; 0x2c00~0x2fff : Cdata[3][i]={0}; 0x3000~0x33ff : Kdata[0][i]={$a_{41}$×Fk[i]}; 0x3400~0x37ff : Kdata[0][i]={$a_{42}$×Fk[i]}; 0x3800~0x3bff : Kdata[2][i]={$a_{43}$×Fk[i]}; 0x3c00~0x3fff : Kdata[3][i]={0}

In the illustrated case of pre-sharpening circuit 28, registers 52Y, 52M and 52C are actuated in response to a clock (CLK) at frequency f and holds serial image data for three colors Y, M and C as they are supplied at input terminal DATA IN.

Then, selector 54 sequentially changes the source of input of an image data and thereby selects one of the image data held in registers 52Y, 52M and 52C; at the same time, selector 54 combines the selected image data with the data on output/input color identification numbers that have been generated from decoder 66, thereby generating an address at which data should be read by LUT 56. If it is assumed that registers 52Y, 52M and 52C hold input data (Yx, Mx, Cx), the scheme of address generation in the case under consideration may be represented as follows:

↓ [0, 0, Yx]

↓ [0, 1, Mx]

↓ [0, 2, Cx]

↓ [0, 3, X] ← End of accumulation

↓ [1, 0, Yx]

⋮  ⋮

↓ [3, 2, Cx]

↓ [3, 3, X] ← End of accumulation

AS shown, selector 54 first selects register 52Y and generates an address (O, O, Yx). The generated address signal is supplied into LUT 56 at A terminal, causing LUT 56 to read data $a_{11}$×Fy(Yx) stored at address (O, O, Yx) and the thus read data is delivered from LUT 56 at D terminal. The output data $a_{11}$×Fy(Yx) is fed into adder 58 such that it is added to the data latched in DFF 60. Before the addition is started, DFF 60 has been cleared by a clear signal CLR from DEC 66 such that there is no data latched within DFF 60; in other words, the contents of DFF 60 are zero. Hence, the result of addition by the adder 58 is $a_{11}$×Fy(Yx) and this value is delivered to DFF 60 and latched there.

In the next step, selector 54 selects register 52M and generates an address signal (0, 1, Mx); in this case, LUT 56 reads out $a_{12}$×Fy(Mx) which is then delivered into adder 58. In the adder 58, $a_{12}$×Fy(Mx) which is the readout from LUT 56 is added to $a_{11}$×Fy(Yx) which has been latched in DFF 60 and the value of addition $a_{11}$×Fy(Yx)+$a_{12}$×Fy(Mx) is latched as an updated data in DFF 60.

Similarly, selector 54 selects register 52C and generates an address signal (0, 2, Cx), which causes LUT 56 to read out $a_{13}$×Fy (Cx); this data is supplied into adder 58 where it is cumulatively added to $a_{11}$×Fy(Yx)+$a_{12}$×Fy(Mx) which has been held in DFF 60; the value of addition $a_{11}$×Fy(Yx)+$a_{12}$×Fy(Mx)+$a_{13}$×Fy(Cx) is latched as an updated data in DFF 60.

Thereafter, selector 54 does not select any of the registers and, hence, no selection of image data signals is effected. As a result, the color identification signal from the decoder 66 will generate an address (0, 3, X) (X is an arbitrary value). Since LUT 56 has the value "zero" written at all of the addresses (0, 3, 0)–(0, 3, 1023), it reads out "0" and the data previously latched in DFF 60 is delivered as such from the adder 58, causing DFF 60 to latch this output value as an updated data. In this case, DFF 62 positioned downstream of DFF 60 is supplied with a clock at frequency f and latches $a_{11}$×Fy(Yx)+$a_{12}$×Fy(Mx)+$a_{13}$×Fy(Cx) which is the data already latched in DFF 60. In response to the next clock, said data is delivered as Yout data from output terminal DATA OUT. DFF 60 is then cleared by a clear signal CLR from the decoder 66.

Thus, the 10-bit input image data (Yx, Mx, Cx) have been processed to produce 8-bit output image data Yout. Similarly, other 8-bit output image data Mout, Cout and Kout are produced to complete the generation of a set of 8-bit image data (Yout, Mout, Cout, Kout), whereupon the tonal and color matrix transformations of three-primary image data end. Subsequently, the next input image data (Yin, Min, Cin) is supplied and subjected to similar procedures of tonal and color matrix transformations, namely, the pre-sharpening process.

It should be noted here that if DFF 62 is driven by a clock at frequency f, the sequential processing with selector 54, LUT 56, adder 58 and DFF 60 is performed in response to a synchronous signal at frequency 4f.

It should also be noted that the counter 64 is supplied with a clock signal at frequency 4f to generate a clock of frequency f, which is supplied into decoder 66 to generate a clear signal of frequency f for use in clearing DFF 60. Decoder 66 also generates data on output/input color identification numbers, which are combined with image data from either one of the registers 52Y, 52M and 52C as selected by means of selector 54 and the resulting composite signal serves as an address signal.

On the foregoing pages, the image processing apparatus of the invention has been described with reference to a typical example in which the characterizing circuit for tonal and color matrix transformations of image is applied as a pre-sharpening circuit. It should, however, be noted that this is not the sole case of the present invention and that said circuit is applicable as any circuits that are to perform tonal transformation simultaneously with either color matrix transformation or three-to-four color transformation.

While the image processing apparatus of the invention has the basic construction described above, the invention is by no means limited thereto and any improvements and design alternations can of course be made without departing from the scope and spirit of the invention.

As described above in detail, the present invention not only permits reduction in circuit scale but also ensures independent processing of image data of four colors, for example, panchromatic platemaking films (color plate making film) such that the resulting image can be subjected to desired tonal and color matrix transformations.

What is claims is:

1. An image processing apparatus having a circuit for tonal and color matrix transformations of an image which performs said tonal transformation on image data of three primary colors and with which a 4×3 matrix is multiplied by a column matrix composed of the tonal transformed image data so as to produce four-color image data including image data of a black color, said circuit for said tonal and color matrix transformations of image having:

a lookup table in which the values of multiplication of the tonal transformed image data, which have been obtained from said image data of three primary colors using nonlinear tonal transformation curves for the respective colors of said three primary colors, by the elements of said matrix to be subjected to said matrix multiplication have been written for each color of said three primary colors in association with all of said image data of said three primary colors;

address signal generating means which generates address signals for referencing said lookup table from said image data of three primary colors and color identification signals; and an accumulation means which adds said values of multiplication within said lookup table for said each color as addressed by an address signal generated by said address signal generating means and which repeats the addition by a predetermined number of times.

2. An image processing circuit according to claim 1, wherein said circuit for tonal and color matrix transformations is a pre-sharpening circuit which performs preliminary processing of said image data such that it is subjected to a sharpening process.

3. An image processing circuit according to claim 1, wherein said address signal generating means has a selector for establishing selective connections to three registers in which serial signals for said image data of three primary colors are held parallel for each color, and a decoder for generating data on output/input color identification numbers.

4. An image processing circuit according to claim 1, wherein said accumulation means has an adder, and a D flip-flop that latches temporarily a value of addition as delivered from said adder, said adder performing the addition of said value of multiplication as read out of said lookup table and said value of addition as latched in said D flip-flop.

5. An image processing circuit according to claim 1, wherein said image data of three primary colors represent yellow, magenta and cyan colors and said four-color image data represent yellow, magenta, cyan and black colors.

* * * * *